United States Patent
Fukuzawa et al.

(10) Patent No.: US 11,643,711 B2
(45) Date of Patent: May 9, 2023

(54) LAMINATE SHAPED ARTICLE, METHOD FOR MANUFACTURING THE SAME, AND METAL POWDER FOR LAMINATE SHAPING

(71) Applicant: HITACHI METALS, LTD., Tokyo (JP)

(72) Inventors: Norihide Fukuzawa, Tokyo (JP); Koichi Sakamaki, Tokyo (JP); Yousuke Nakano, Tokyo (JP); Kousuke Kuwabara, Tokyo (JP); Shiho Fukumoto, Tokyo (JP); Kazuya Saito, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 67 days.

(21) Appl. No.: 16/767,111

(22) PCT Filed: Dec. 17, 2018

(86) PCT No.: PCT/JP2018/046299
§ 371 (c)(1),
(2) Date: May 26, 2020

(87) PCT Pub. No.: WO2019/124296
PCT Pub. Date: Jun. 27, 2019

(65) Prior Publication Data
US 2020/0399747 A1    Dec. 24, 2020

(30) Foreign Application Priority Data
Dec. 18, 2017  (JP) .............................. JP2017-241300

(51) Int. Cl.
| | | |
|---|---|---|
| *B33Y 80/00* | (2015.01) | |
| *B33Y 10/00* | (2015.01) | |
| *B33Y 70/00* | (2020.01) | |
| *C22C 38/06* | (2006.01) | |
| *C22C 38/08* | (2006.01) | |
| *C22C 38/10* | (2006.01) | |
| *C22C 38/12* | (2006.01) | |
| *C22C 38/14* | (2006.01) | |
| *B22F 1/142* | (2022.01) | |
| *B22F 10/28* | (2021.01) | |
| *B22F 10/36* | (2021.01) | |
| *B22F 9/08* | (2006.01) | |
| *B22F 10/32* | (2021.01) | |
| *B22F 10/366* | (2021.01) | |
| *B22F 10/64* | (2021.01) | |

(52) U.S. Cl.
CPC .............. *B33Y 80/00* (2014.12); *B22F 1/142* (2022.01); *B22F 10/28* (2021.01); *B22F 10/36* (2021.01); *B33Y 10/00* (2014.12); *B33Y 70/00* (2014.12); *C22C 38/06* (2013.01); *C22C 38/08* (2013.01); *C22C 38/105* (2013.01); *C22C 38/12* (2013.01); *C22C 38/14* (2013.01); *B22F 9/082* (2013.01); *B22F 10/32* (2021.01); *B22F 10/366* (2021.01); *B22F 10/64* (2021.01); *B22F 2301/35* (2013.01); *B22F 2304/10* (2013.01)

(58) Field of Classification Search
CPC ................................. C22C 38/14; B33Y 80/00
USPC .......................................................... 419/6
See application file for complete search history.

(56) References Cited

U.S. PATENT DOCUMENTS

| | | | | | |
|---|---|---|---|---|---|
| 4,832,909 A | * | 5/1989 | Schmidt | ................ | C22C 38/105 148/328 |
| 2013/0065073 A1 | | 3/2013 | Fuwa | | |

FOREIGN PATENT DOCUMENTS

| | | |
|---|---|---|
| CN | 106825566 | 6/2017 |
| EP | 3702063 | 9/2020 |
| JP | H07243003 | 9/1995 |
| JP | 2001279386 | 10/2001 |
| JP | 2017025392 | 2/2017 |
| JP | 2017128770 | 7/2017 |
| WO | 2011149101 | 12/2011 |

OTHER PUBLICATIONS

"Notice of allowance of Singapore Counterpart Application", dated May 20, 2021, p. 1-p. 6.
Yi He et al., "Microstructure and mechanical properties of a 2000 MPa grade Co-free maraging steel", Metallurgical and Materials Transactions A, Sep. 1, 2005, pp. 2273-2287.
Chaolin Tan et al., "Microstructural evolution, nanoprecipitation behavior and mechanical properties of selective laser melted high-performance grade 300 maraging steel", Materials & Design, Aug. 12, 2017, pp. 23-34.

(Continued)

*Primary Examiner* — Weiping Zhu
(74) *Attorney, Agent, or Firm* — JCIPRNET

(57) ABSTRACT

Provided are a laminate shaped article made of a maraging steel and having excellent toughness, a method for manufacturing the same, and a metal powder for laminate shaping. The laminate shaped article is made of a maraging steel comprising 0.1-5.0 mass % of Ti. When sis is performed on concentration distribution of Ti in a cross section parallel to a lamination direction of the above laminate shaped article, a length of a linear Ti-rich portion having a Ti concentration B of (1.5×A) or more with respect to an average Ti concentration A in the cross section is 15 μm or less. In addition, the method for manufacturing the laminate shaped article uses a metal powder made of a maraging steel comprising 0.1-5.0 mass % of Ti, and a heat source output is set to 50-330 W and a scanning speed is set to 480-3000 mm/sec during the laminate shaping.

12 Claims, 2 Drawing Sheets

(56) References Cited

OTHER PUBLICATIONS

Renliang Xu et al., "Comparison of sizing small particles using different technologies", Powder Technology, Jun. 24, 2003, pp. 145-153.
"Search Report of Europe Counterpart Application", dated Jul. 21, 2021, p. 1-p. 16.
"International Search Report (Form PCT/ISA/210) of PCT/JP2018/046299," dated Feb. 12, 2019, with English translation thereof, pp. 1-3.
Jiang Yue, "New Maraging Stainless Steel and Its Strength and Toughness Paperback," with English abstract thereof, Jan. 2017, pp. 1-7.
"Office Action of China Counterpart Application" with English translation thereof, dated Jan. 17, 2022, p. 1-p. 19.

\* cited by examiner

| | (a) element mapping image | (b) binarized image |
|---|---|---|
| Condition 1 (the present invention example)<br><br>Ti concentration A: 2.05%<br><br>Ti concentration B: 3.08% or more |  |  |
| Condition 2 (comparative example)<br><br>Ti concentration A: 1.99%<br><br>Ti concentration B: 2.99% or more |  |  |

100 μm

LAMINATE SHAPED ARTICLE, METHOD FOR MANUFACTURING THE SAME, AND METAL POWDER FOR LAMINATE SHAPING

CROSS-REFERENCE TO RELATED APPLICATION

This application is a 371 application of the International PCT application serial no. PCT/JP2018/046299, filed on Dec. 17, 2018, which claims the priority benefit of Japan Patent Application No. 2017-241300, filed on Dec. 18, 2017. The entirety of each of the above-mentioned patent applications is hereby incorporated by reference herein and made a part of this specification.

TECHNICAL FIELD

The present invention relates to a laminate shaped article that can be used for mold parts such as a mold and an extrusion (ejector) pin, other tool products, structural parts and the like, and a method for manufacturing the laminate shaped article. In addition, the present invention relates to a metal powder for laminate shaping that can be used for manufacturing these laminate shaped articles.

RELATED ART

Recently, a laminate shaping method has attracted attention as means which can easily form metal products (parts) which have complicated shapes by near net shaping. The laminate shaping method refers to additive manufacturing which is also commonly referred to as 3D printing. Besides, the type of the laminate shaping method may be, for example, a powder spray method in which a metal powder is irradiated with a heat source and is melted and laminated, or a powder bed method in which an operation of irradiating a heat source on a metal powder spread on a stage to melt the powder and then solidifying the molten metal powder is repeatedly performed for lamination.

According to the laminate shaping method, the metal product having a complicated shape can be manufactured by largely omitting conventional machining steps, and thus hard-to-work metal materials can be used. Besides, because the hard-to-work metal materials are exclusively high-strength metal materials, a metal product having a complicated shape and a long life can be manufactured.

The high-strength metal materials include maraging steels. The maraging steel is, for example, an age hardening type high-strength steel which is obtained by adding age hardening elements such as Co, Mo, Ti, Al and the like into a steel comprising about 18 mass % of Ni. Besides, the maraging steel is also excellent in toughness, and thus using the maraging steel in materials for various tools and structural parts is effective in improving the life of these products. Besides, a laminate shaped article is proposed which is manufactured by the above laminate shaping method using the maraging steel for the metal material (paten literatures 1, 2).

LITERATURES OF PAST

Patent Literatures

Paten literature 1: International Publication No. 11/149101 Pamphlet
Paten literature 2: Chinese Patent Application Publication No. 106825566

SUMMARY

Problems to be Solved

The laminate shaped article made of a maraging steel can be expected to have high strength and excellent toughness while being able to cope with complicated product shapes. However, some of the actually laminate shaped articles do not achieve sufficient toughness corresponding to the component composition of the maraging steel.

One or some exemplary embodiments of the present invention is to provide a laminate shaped article made of a maraging steel and excellent in toughness and a method for manufacturing the same. Besides, an objective of the present invention is to provide a metal powder for laminate shaping which can be used for the manufacturing of these laminate shaped articles.

The present invention is a laminate shaped article made of a maraging steel comprising 0.1-5.0 mass % of Ti, wherein when surface analysis is performed on concentration distribution of Ti in a cross section parallel to a lamination direction of the laminate shaped article, a length of a linear Ti-rich portion having a Ti concentration B of (1.5×A) or more with respect to an average Ti concentration A in the cross section is 15 μm or less. Besides, the hardness of the laminate shaped article can be 40-60 HRC.

In addition, the present invention is a method for manufacturing a laminate shaped article forming an article by a laminate shaping step in which an operation of spreading a metal powder made of a maraging steel comprising 0.1-5.0 mass % of Ti on a stage and an operation of scanning and irradiating a heat source on the metal powder spread on the stage are repeatedly performed, wherein a heat source output is 50-330 W and a scanning speed is 480-3000 mm/sec when the heat source is scanned and irradiated on the metal powder.

Besides, the present invention can be the method for manufacturing a laminate shaped article in which a heat treatment step including a solution treatment and an aging treatment is further performed on the article formed in the laminate shaping step.

Besides, the present invention is a metal powder for laminate shaping, which is made of a maraging steel comprising 0.1-5.0 mass % of Ti and has a median diameter D50 of 200 μm or less.

In the case of the present invention, the above maraging steel preferably has a Co content of 0-20 by mass %. Besides, the above maraging steel is made of, for example, a component composition as following by mass %: C: 0.1% or less, Ni: 14-22%, Co: 0-20%, Mo: 0.1-15.0%, Ti: 0.1-5.0%, Al: 3.0% or less, and the balance comprising Fe and impurities.

According to the present invention, toughness of the laminate shaped article made of a maraging steel can be improved.

DESCRIPTION OF THE EMBODIMENTS

Figure 1:
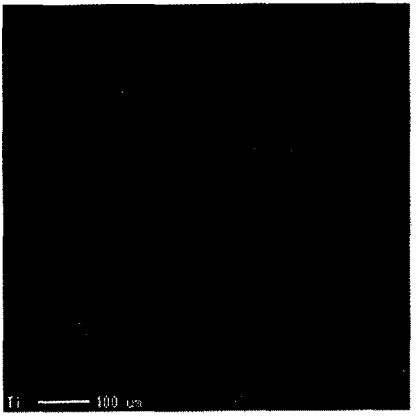
FIG. 1 is a diagram showing an element mapping image (a) of Ti when cross sections parallel to lamination directions of laminate shaped articles of the present invention example and a comparative example are analyzed by an EPMA (Electron Probe Micro Analyzer), and an image (b) obtained by binarizing the image (a).
Figure 1:
Figure 1:
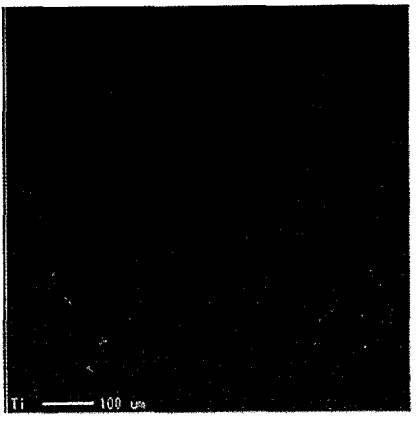
Figure 1:
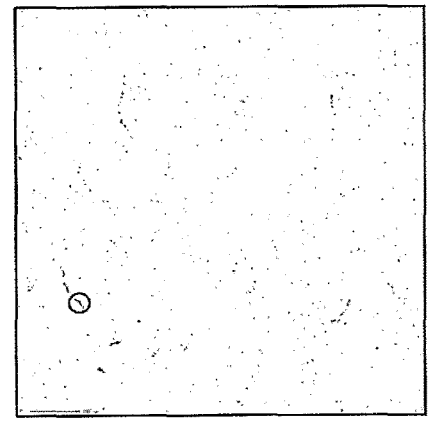

A feature of the present invention is that deterioration of the toughness of the laminate shaped article made of a maraging steel is found to occur due to a relationship between Ti in the component composition and a special manufacturing step referred to as the laminate shaping method. Each requirement of the present invention is described below together with preferred requirements.

(1) The laminate shaped article of the present invention is made of a maraging steel comprising 0.1 to 5.0 mass % of Ti.

For the maraging steel, Ti is an element that forms $Ni_3Ti$ being a strengthening phase in a structure after an aging treatment and imparts strength to the maraging steel. However, if the Ti content is too large, remarkable Ti segregation occurs in the structure at the time of solidification, and this remarkable Ti segregation remains in the structure after the aging treatment, leading to deterioration in the toughness of the maraging steel. Therefore, in the present invention, the Ti content is set to 0.1-5.0 mass %, preferably 0.5 mass % or more, more preferably 0.1 mass % or more, and further preferably 1.5 mass % or more. In addition, the Ti content is preferably 4.0 mass % or less, more preferably 3.0 mass % or less, and further preferably 2.5 mass % or less.

(2) In the laminate shaped article of the present invention, when surface analysis is performed on concentration distribution of Ti in a cross section parallel to a lamination direction of the laminate shaped article, a length of a linear Ti-rich portion having a Ti concentration B of (1.5×A) or more with respect to an average Ti concentration A in the cross section is 15 μm or less.

As described above, by setting the Ti content of the maraging steel to 5.0 mass % or less, the segregation of Ti in the structure can be reduced, and the toughness of the maraging steel can be ensured. However, when the maraging steel is made into a laminate shaped article, even if the Ti content of the maraging steel is suppressed to 5.0 mass % or less, due to the special manufacturing step referred to as the laminate shaping method, sufficient toughness corresponding to the component composition may not be achieved.

That is, even for the maraging steel comprising 0.1-5.0 mass % of Ti according to the present invention, a considerable amount of Ti segregation may occur in the structure at the time of solidification. In this case, if the laminate shaping method is used, the solidified structure is easily formed by extending in the laminating direction. Therefore, a finally solidified portion where alloy elements in the maraging steel are concentrated is also likely to have a long shape along the lamination direction, and the finally solidified portion where the alloy elements are concentrated becomes "linear" segregation.

Besides, the laminate shaped article made of maraging steel is then subjected to a heat treatment step including a solution treatment and an aging treatment, and when the Ti in the structure forms a strengthening phase of $Ni_3Ti$, a larger amount of $Ni_3Ti$ is formed in the Ti-rich segregation portion than in other parts. Besides, because the shape of the $Ni_3Ti$ formed in a larger amount is also "linear", it is considered that this promotes crack propagation during use. As a result, in the case of the laminate shaped article made of maraging steel, it is considered that comprising Ti makes the toughness, in particular, the toughness in a direction perpendicular to the lamination direction (in other words, a scanning direction of a heat source) deteriorate easily.

Therefore, in order to improve the toughness of the laminate shaped article made of a maraging steel comprising Ti, it is effective to reduce the above-mentioned linear Ti segregation. Besides, it is effective to reduce the $Ni_3Ti$ having a linear shape after the heat treatment step including the solution treatment and the aging treatment. That is, before the above heat treatment step, the "length" of the linear Ti segregation distributed in the cross section parallel to the lamination direction of the laminate shaped article is reduced (the Ti concentration in the cross section is leveled). In addition, after the above heat treatment step, the "length" of the linear $Ni_3Ti$ distributed in the cross section parallel to the lamination direction of the laminate shaped article is reduced (the shape of the $Ni_3Ti$ is made isotropic). Besides, in the present invention, when surface analysis is performed on the Ti concentration distribution in the cross section parallel to the lamination direction of the laminate shaped article before or after the heat treatment step, the length of the linear Ti-rich portion having a Ti concentration B of (1.5×A) or more with respect to the average Ti concentration A of the cross section is 15 μm or less. Besides, the length is preferably less than 10 μm.

Moreover, the above "linear Ti-rich portion" is a continuous and elongated Ti-rich portion. Besides, when the elongated shape of the Ti-rich portion is a straight line or a curve, the above "linear Ti-rich portion" can be confirmed, for example, to be a form in which "the length of the Ti-rich portion" which is the length of the straight line or the curve is approximately three times or more the maximum width in a direction perpendicular to a longitudinal direction of the straight line or the curve. Besides, the expression that "the length of the Ti-rich portion is 15 μm or less" means that the length of the continuous elongated Ti-rich portion is limited to 15 μm or less. Besides, this includes a case where the above length is "0 μm" (that is, a case where there is no continuous elongated Ti-rich portion).

On the other hand, in the cross section parallel to the lamination direction of the laminate shaped article of the present invention, a dot-shaped Ti-rich portion other than the linear Ti-rich portion may be present. The dot-shaped Ti-rich portion may be a Ti-rich portion other than the above "linear Ti-rich portion". Due to the substantially isotropic shape, the dot-shaped Ti-rich portion is unlikely to be a path that promotes the crack propagation described above regardless of the size of the dot-shaped Ti-rich portion, and thus the dot-shaped Ti-rich portion has a small degree of influence in deteriorating the toughness of the laminate shaped article.

For the "surface analysis" of the Ti concentration distribution of the cross section for measuring "the length of the linear Ti-rich portion", for example, an EPMA (Electron Probe Micro Analyzer) can be used. First, the cross section parallel to the lamination direction of the laminate shaped article is sampled from a position of the center of the laminate shaped article. At this time, the fact that the above cross section is "the cross section parallel to the lamination direction" can be confirmed from the specification of the laminate shaped article, a lamination trace in the laminate shaped article, and the like. Then, an EPMA analysis is performed on this cross section at a region of 800 µm in length×800 µm in width at a magnification of 100 times at 400 equally spaced points in each of the vertical and horizontal directions (a total of 160,000 points), and thereby the average Ti concentration A of this cross section can be obtained. Then, an element mapping image can be obtained ((a) of FIG. 1) which shows a distribution situation of a Ti-rich portion having a Ti concentration B of (1.5×A) or more with respect to the average Ti concentration A. At this time, the element mapping image is binarized with a critical value of the Ti concentration B as a threshold value, and thereby the Ti-rich portion can be clearly recognized ((b) of FIG. 1). Then, the length of the linear Ti-rich portion can be confirmed from the binarized image. Moreover, in this binarized image, when the Ti-rich portion is displayed as an aggregation of pixels (black point group) at each analysis position, the "linear" shape of the Ti-rich portion can be confirmed by the fact that respective pixels are vertically, horizontally, and diagonally "adjacent".

When the "linear Ti-rich portion" according to the present invention is confirmed in one or two or more of the above regions of 800 µm in length×800 µm in width, the fact of the present invention that "the length of the linear Ti-rich portion is 15 µm or less" can also be referred to as that "a linear Ti-rich portion having a length exceeding 15 µm is less than 1.0 in each region of 800 µm in length×800 µm in width". "Less than 1.0" includes the case of "0".

(3) The laminate shaped article of the present invention is preferably made of a maraging steel having a Co content of 0-20 mass %.

For the maraging steel, Co is an element having an effect of improving strength and toughness of a product. In this point, Co can be contained in the laminate shaped article of the present invention as a selective element. The Co content is preferably 0.1 mass % or more, more preferably 0.2 mass % or more, and further preferably 0.3 mass % or more.

On the other hand, Co is an expensive element. Besides, when there is too much Co, the toughness is deteriorated with the increase in hardness of the laminate shaped article. Therefore, even when Co is contained, an upper limit of the Co content is preferably set to 20 mass % or more. Moreover, as described above, the laminate shaped article of the present invention has improved toughness by suppressing the linear Ti-rich portion in the structure. Therefore, in this point, in the present invention, the content of Co which is a toughness improving element can be limited to a low level. The Co content can be preferably limited preferably to 15 mass % or less, more preferably to 10 mass % or less, and further preferably to 5 mass % or less.

(4) The laminate shaped article of the present invention is preferably made of a component composition as following by mass %: C: 0.1% or less, Ni: 14-22%, Co: 0-20%, Mo: 0.1-15.0%, Ti: 0.1-5.0%, Al: 3.0% or less, and the balance comprising Fe and impurities.

C: 0.1 Mass % or Less

C is an element that is usually regulated in order to obtain a low-carbon martensitic structure with high toughness that is characteristic of the maraging steel. Therefore, in the present invention, C is preferably limited to 0.1 mass % or less, more preferably limited to 0.08 mass % or less, and further preferably limited to 0.05 mass % or less.

Ni: 14-22 Mass %

Ni is a fundamental element which forms an intermetallic compound with Ti, Mo, or the like to contribute to improvement in strength and which is necessary for forming a maraging steel. Therefore, the Ni content is preferably 14 mass % or more, more preferably 15 mass % or more, and further preferably 16 mass % or more.

However, if there is too much Ni, an austenite structure is stabilized, and a martensite structure is difficult to form. Therefore, the Ni content is preferably 22 mass % or less, more preferably 20 mass % or less, and further preferably 19 mass % or less.

Mo: 0.1-15.0 Mass %

Mo is an element that has an effect of forming $Ni_3Mo$ which is an intermetallic compound at the time of the aging treatment, strengthening the metal structure in a precipitation manner or a solid-solution manner, and improving the strength of the maraging steel. Therefore, the Mo content is preferably 0.1 mass % or more, more preferably 0.5 mass % or more, and further preferably 1.0 mass % or more.

However, if there is too much Mo, a coarse intermetallic compound is formed with Fe, and the toughness of the maraging steel decreases. Therefore, the Mo content is preferably 15.0 mass % or less, more preferably 10.0 mass % or less, and further preferably 5.0 mass % or less.

Al: 3.0 Mass % or Less

Al is an element that can be used as a deoxidizer in a melting step of maraging steel materials. Besides, if there is too much Al in the maraging steel after the melting, non-metallic inclusions increase in the metal structure, and the toughness of the maraging steel decreases. Therefore, the Al content is preferably 3.0 mass % or less, more preferably 1.0 mass % or less, and further preferably 0.5 mass % or less.

Moreover, when Al is contained in the maraging steel, Al has the effect of forming an intermetallic compound with Ni and strengthening the metal structure in a precipitation manner. Therefore, when Al is contained, the Al content can be 0.01 mass % or more. The Al content is more preferably 0.03 mass % or more, and further preferably 0.05 mass % or more.

In the maraging steel according to the present invention, a component composition in which the above element species are selectively contained and the balance contains Fe and impurities can be set as a basic component composition.

(5) The laminate shaped article of the present invention can be manufactured, for example, by a method for manufacturing laminate shaped article in which an article is formed by a laminate shaping step, and in the laminate shaping step, an operation of spreading a metal powder made of a maraging steel comprising 0.1-5.0 mass % of Ti on a stage and an operation of scanning and irradiating a heat source on the metal powder spread on the stage are repeatedly performed, wherein a heat source output is 50-330 W and a scanning speed is 480-3000 mm/sec when the heat source is scanned and irradiated on the metal powder.

The above method for manufacturing laminate shaped article is particularly based on a powder bed method conventionally known. For example, the article is formed by a laminate shaping step in which a predetermined metal powder is spread on a stage, a heat source is scanned and irradiated on the metal powder spread on the stage, the metal powder is partially melted and solidified, and the above operation is repeated above a scanning direction of the heat source. For example, a laser or an electron beam can be used as the heat source.

Besides, the metal powder made of a maraging steel comprising 0.1-5.0 mass % of Ti is used as the above predetermined metal powder, and conditions at the time of irradiation with the above heat source are adjusted to the following special conditions, and thereby the linear Ti-rich portion (the Ti segregation) in the formed article can be suppressed, and the toughness of the laminate shaped article can be improved.

First, if the output of the heat source is too high, the melted part of the metal being irradiated with the heat source becomes deep, strong segregation occurs during solidification, and as a result, a long "linear Ti-rich portion" is easily formed. However, when the output of the heat source is too low, the metal powder cannot be sufficiently melted, and many voids derived from gaps between the metal powders are formed in the shaped article after the solidification. Therefore, the output of the heat source is preferably 50-330 W, more preferably 100 W or more, further preferably 150 W or more, still more preferably 200 W or more, and particularly preferably 250 W or more.

Next, if the scanning speed of the heat source is too fast, the metal powder cannot obtain sufficient heat, and the metal powder is not sufficiently melted accordingly. As a result, many of the above voids are easily formed in the shaped article after the solidification. However, if the scanning speed of the heat source is too slow, the melted part of the metal being irradiated with the heat source becomes deep, and as a result, a long "linear Ti-rich portion" is easily formed. In addition, if the scanning speed of the heat source is too slow, excessive heat is applied to the metal powder, flow of the molten metal becomes active and gas is involved therein. Accordingly, air bubbles are easily mixed into the shaped article after solidification. Therefore, the scanning speed is preferably 480-3000 mm/sec, more preferably 500 mm/sec or more, and further preferably 800 mm/sec or more. In addition, the scanning speed is more preferably 2000 mm/sec or less, and further preferably 1500 mm/sec or less.

Besides, in the above method for manufacturing laminate shaped article, a scanning pitch may be 0.02-0.20 mm. The scanning pitch is a distance between adjacent beam irradiation positions (interval between beam center positions) for a heat source to be scanned. If the scanning pitch is too large, the spread metal powder is difficult to be melted over the entire surface during the irradiation with the heat source, which may also be a factor in forming the voids inside the shaped article after solidification. Besides, if the scanning pitch is too small, the melted part of the metal being irradiated with the heat source becomes deep, and a long "linear Ti-rich portion" is easily formed. Therefore, the scanning pitch is preferably 0.02-0.20 mm, more preferably 0.05 mm or more. In addition, the scanning pitch is more preferably 0.15 mm or less.

Moreover, if a lamination thickness per scan is too large, heat is difficult to be transmitted to the entire spread metal powder at the time of irradiation with the heat source, and the metal powder is not sufficiently melted. The "lamination thickness per scan" is "a thickness of each metal powder layer" spread at the time of the laminate shaping. Besides, if the lamination thickness per scan is too small, the number of lamination layers required to reach a predetermined size of the laminate shaped article increases, and the time required for the laminate shaping step becomes longer. Therefore, the lamination thickness per scan is preferably 10-200 μm, more preferably 20 μm or more, and further preferably 30 μm or more. In addition, the lamination thickness per scan is more preferably 100 μm or less, further preferably 80 μm or less, and still more preferably 60 μm or less.

An atmosphere during the laminate shaping step may be, for example, an inert atmosphere such as an argon gas or the like, or a nitrogen gas. In addition, a reduced pressure environment (including vacuum) may be employed. Particularly, when an electron beam is used as the heat source, the atmosphere at the time of the shaping is preferably a reduced pressure environment (including vacuum).

Besides, the laminate shaped article of the present invention can be manufactured, for example, by the method for manufacturing laminate shaped article which includes: a step in which the metal powder having a median diameter D50 (50% particle diameter of volume-based cumulative particle size distribution) of 200 μm or less and made of a maraging steel comprising 0.1-5.0 mass % of Ti is spread to a layer shape, and a step in which the spread metal powder is sequentially melted by a scanning heat source and is solidified to thereby form a solidified layer. In the method for manufacturing laminate shaped article, the step in which a metal powder is spread to a layer shape and the step in which a solidified layer is formed are repeated to form a plurality of layer-shaped solidified layers.

The D50 of the above metal powder is preferably 200 μm or less in that the metal powder can be spread evenly. The D50 is more preferably 100 μm or less, further preferably 75 μm or less, and still more preferably 50 μm or less. Moreover, from the point that the metal powder does not easily scatter during irradiation with the scanning heat source, a lower limit of the D50 is, for example, preferably 10 μm, and more preferably 20 μm.

A laser or an electron beam can be used for the above scanning heat source. Making a diameter of the scanning heat source larger than the D50 of the metal powder is preferable in that aggregation of the metal powder can be uniformly melted. At this time, the diameter of the scanning heat source can be specified by, for example, a focus width of the heat source.

(6) Preferably, the article formed in the above laminate shaping step is further subjected to a heat treatment step including a solution treatment and an aging treatment.

The maraging steel is usually used as a product after the solution treatment and the aging treatment are performed. By performing the solution treatment, high toughness due to the low carbon martensite structure can be obtained. Then, by performing the aging treatment thereafter, various intermetallic compounds are precipitated in the structure, and more excellent high strength and high toughness can be obtained when the hardness is adjusted to, for example, 40-60 HRC. The hardness is preferably 42 HRC or more. In addition, the hardness is preferably 55 HRC or less, more preferably 50 HRC or less, and further preferably 48 HRC or less. Besides, in the case of the laminate shaped article made of a maraging steel of the present invention, the above solution treatment is a more preferable treatment for eliminating the Ti-rich portion (Ti segregation) formed in the structure in the laminate shaping step.

A solution treatment temperature is preferably 800° C. or higher, and more preferably 830° C. or higher. Besides, the solution treatment temperature is further preferably 900° C. or higher, still more preferably 950° C. or higher, and particularly preferably 1000° C. or higher. An effect of eliminating the Ti segregation is improved by increasing the solution treatment temperature. However, if the solution treatment temperature is too high, prior austenite grains are coarsened, and thus the strength and the toughness of the laminate shaped article are reduced. Therefore, the solution treatment temperature is preferably 1200° C. or lower, more preferably 1100° C. or lower, and further preferably 1050° C. or lower.

Besides, a solution treatment time (a retention time at the solution treatment temperature) is preferably 10 minutes or more, more preferably 30 minutes or more, and further preferably 45 minutes or more. By increasing the solution treatment time, the effect of eliminating the Ti segregation is improved. However, if the solution treatment time is too long, the prior austenite grains are coarsened. Therefore, the solution treatment time is preferably 120 minutes or less, more preferably 100 minutes or less, and further preferably 80 minutes or less.

An aging treatment temperature is preferably 400° C. or higher, more preferably 450° C. or higher, further preferably 500° C. or higher, and still more preferably 550° C. or higher. By increasing the aging treatment temperature, the effect of improving the strength by the precipitation of $Ni_3Ti$ is improved. However, if the aging treatment temperature is too high, the intermetallic compound is coarsened, and the strength corresponding to a precipitation amount of the intermetallic compound cannot be sufficiently obtained. Therefore, the aging treatment temperature is 700° C. or lower, more preferably 650° C. or lower, further preferably 640° C. or lower, and still more preferably 630° C. or lower. The aging treatment temperature can also be 600° C. or lower.

Besides, an aging treatment time (a retention time at the aging treatment temperature) is preferably 60 minutes or more, more preferably 100 minutes or more, and further preferably 150 minutes or more. By increasing the aging treatment time, an amount of the formed intermetallic compound is increased. However, if the aging treatment time is too long, the intermetallic compound is coarsened, and the strength decreases. Therefore, the aging treatment time is preferably 600 minutes or less, more preferably 400 minutes or less, and further preferably 200 minutes or less.

Implementation Example 1

A metal powder of a maraging steel having a component composition in Table 1 and having a D50 of 35.6 μm is prepared using a gas atomizing method. Then, a laminate shaping step using a powder bed method is implemented using the metal powder, and an object made of the laminate shaped article having a length of 15 mm×a width of 60 mm×a height of 15 mm is manufactured. EOS-M290 manufactured by EOS Co., Ltd. is used for the laminate shaping. An atmosphere at the time of shaping is argon gas. Conditions of the laminate shaping step are shown in Table 2.

TABLE 1

| C | Ni | Co | Mo | Ti | Al | (mass %) Fe※ |
|---|----|----|----|----|----|--------------|
| 0.05 | 18 | 0.5 | 2.0 | 2.0 | 0.1 | Balance |

※Impurities are included.

TABLE 2

| Condition | Laser output [W] | Laser focus width [μm] | Scanning speed [mm/s] | Lamination thickness per scan [μm] | Scanning pitch [mm] |
|---|---|---|---|---|---|
| 1 (the present invention example) | 300 | 80 | 1000 | 40 | 0.10 |
| 2 (comparative example) | 350 | 80 | 700 | 40 | 0.10 |

With respect to the hardness of the laminate shaped articles under Conditions 1 and 2 obtained by the above laminate shaping step, the hardness of the laminate shaped article under Condition 1 is 37.0 HRC, and the hardness of the laminate shaped article under Condition 2 is 37.8 HRC. Besides, for these laminate shaped articles, surface analysis is performed on a cross section parallel to a lamination direction by the following EPMA, and a distribution state of the Ti concentration in the cross section is examined. First, a cross section parallel to the lamination direction of the laminate shaped article is sampled from a center position of the laminate shaped article. Next, a region of 800 μm in length×800 μm in width in this cross section is observed with a scanning electron microscope (at a magnification of 100 times), and the observed region is analyzed by the EPMA at 400 equally spaced points in each of the vertical and horizontal directions (a total of 160,000 points). As a result, an average Ti concentration A of the cross section in the laminate shaped article of Condition 1 (the present invention example) is 2.05 mass %, and an average Ti concentration A of the laminate shaped article of Condition 2 (comparative example) is 1.99 mass %.

((a) of FIG. 1) is an element mapping image of Ti in the region which is obtained by the surface analysis using EPMA for the laminate shaped articles under Conditions 1 and 2. In ((a) of FIG. 1), in the case of an original color image, a Ti-rich portion having a Ti concentration B (which is 3.08 mass % or more under Condition 1 and 2.99 mass % or more under Condition 2) equal to or more than a value obtained by the formula of (1.5×A) with respect to the above average Ti concentration A is indicated by a dot-shaped or linear distribution having a color tone different from surroundings (parts having the Ti concentration A).

((b) of FIG. 1) is an image obtained by performing a binarization process on the element mapping image of ((a) of FIG. 1) with a critical value of the Ti concentration B as a threshold value to clarify the shape of the Ti-rich portion. In ((b) of FIG. 1), a black point group (an aggregation of pixels) dispersed on a white background is the Ti-rich portion. Besides, according to ((b) of FIG. 1), the linear Ti-rich portion (a circled portion) made of the aggregation of adjacent pixels and having a length of 21 μm is recognized in the laminate shaped article under Condition 2. Moreover, in the laminate shaped article under Condition 1, for example, a dot-shaped Ti-rich portion having a particle diameter of 10 μm is recognized (circled portion), but a linear Ti-rich portion having a length exceeding 15 μm is not recognized.

Implementation Example 2

The heat treatment step including the solution treatment and the aging treatment is performed on objects made of the laminate shaped articles under Conditions 1 and 2 manufactured in Implementation example 1. In the solution treatment, the object is kept at 850° C. for one hour and cooled in a furnace. Thereafter, in the aging treatment, the object is kept at 600° C. for 3 hours and cooled by air. The hardness after the heat treatment step of the laminate shaped article under Condition 1 is 45.9 HRC, and the hardness of the laminate shaped article under Condition 2 is 47.3 HRC.

Then, for the laminate shaped articles (hereinafter, referred to as the "laminate shaping product") under Conditions 1 and 2 which are obtained by the above heat treatment step, surface analysis is performed on the cross section parallel to the lamination direction using an EPMA in the same manner as in Implementation example 1, and a distribution state of the Ti concentration in the cross section is examined.

As a result of the above analysis, the average Ti concentration A of the cross section of the laminate shaping product under Condition 1 is 2.14 mass %, and the average Ti concentration A of the laminate shaping product under Condition 2 is 2.00 mass %.

Figure 2:
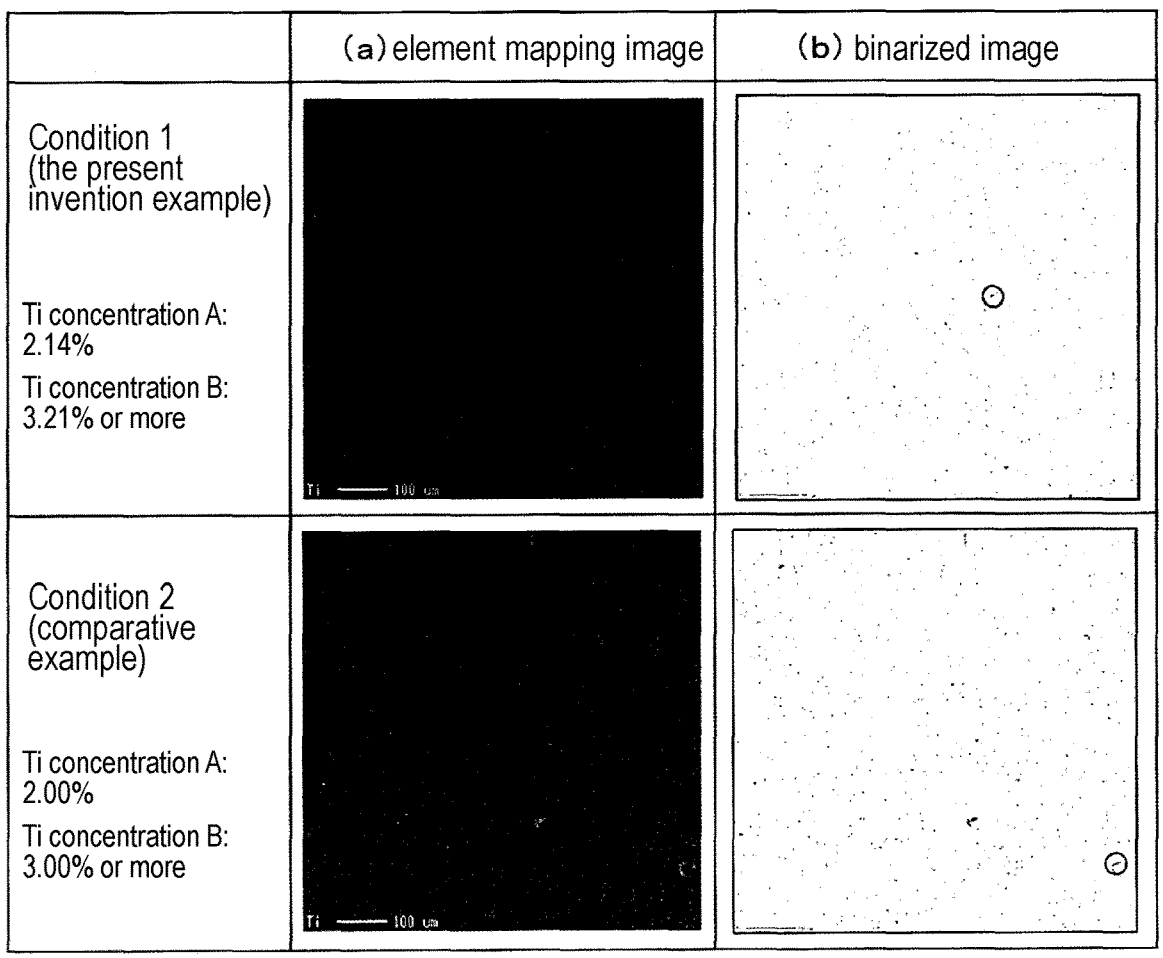
FIG. 2 is a diagram showing an element mapping image (a) of Ti when cross sections parallel to lamination directions of laminate shaped articles after a heat treatment step of the present invention example and a comparative example are analyzed by an EPMA, and an image (b) obtained by binarizing the image (a).

((a) of FIG. 2) is an element mapping image of Ti in the region which is obtained by the surface analysis using EPMA for the laminate shaped articles under Conditions 1 and 2. In ((a) of FIG. 2), in the case of an original color image, a Ti-rich portion having a Ti concentration B (which is 3.21 mass % or more under Condition 1 and 3.00 mass % or more under Condition 2) with respect to the above average Ti concentration A is indicated by a dot-shaped or linear distribution having a color tone different from surroundings (parts having the Ti concentration A). Besides, ((b) of FIG. 2) is an image obtained by performing a binarization process on the element mapping image of ((a) of FIG. 2) with a critical value of the Ti concentration B as a threshold value. In ((b) of FIG. 2), regarding the Ti-rich portion of the laminate shaping product under Condition 1, several small dot-shaped Ti-rich portions having a diameter of less than 10 μm are confirmed. Besides, a linear Ti-rich portion having a length of 8 μm is confirmed (circled portion), and a linear Ti-rich portion having a length exceeding 15 μm is not recognized. In contrast, in the laminate shaping product under Condition 2, a linear Ti-rich portion (circled portion) consisting of great aggregation of adjacent pixels and having a length of 22 μm is recognized.

Then, the toughness in a direction (the scanning direction of the laser) perpendicular to the lamination direction is examined for the laminate shaping products obtained by performing the above heat treatment step. In the examination of toughness, a Charpy test piece is sampled from the above laminate shaping product in a manner that a length direction of a notch matches the lamination direction, and a 5 U notch Charpy test in accordance with JIS Z 2242 is implemented. As a result, an impact value of the laminate shaping product under Condition 2 is 19.7 J/cm². In contrast, an impact value of the laminate shaping product under Condition 1 is 21.6 J/cm² and is 20.0 J/cm² or more. The laminate shaping product under Condition 1 has sufficient toughness to be used as various tool products or structural parts.

Implementation Example 3

A heat treatment step including a solution treatment and an aging treatment different from Implementation example 2 is performed on the object made of the laminate shaped article under Condition 1 manufactured in Implementation example 1. In the solution treatment, the object is kept at 1020° C. for one hour and cooled in a furnace. Thereafter, in the aging treatment, the object is kept at 600° C. for 3 hours and cooled by air. The hardness after the heat treatment step is 45.4 HRC.

For the laminate shaping product under Condition 1 which is obtained by performing the above heat treatment step, surface analysis is performed on the cross section parallel to the lamination direction using an EPMA in the same manner as in Implementation example 1, and a distribution state of the Ti concentration in the cross section is examined. As a result, an average Ti concentration A of the cross section is 2.06 mass %. Besides, a Ti concentration B (that is, Ti-rich portion) with respect to the Ti concentration A is confirmed to be 3.09 mass % or more.

Figure 3:
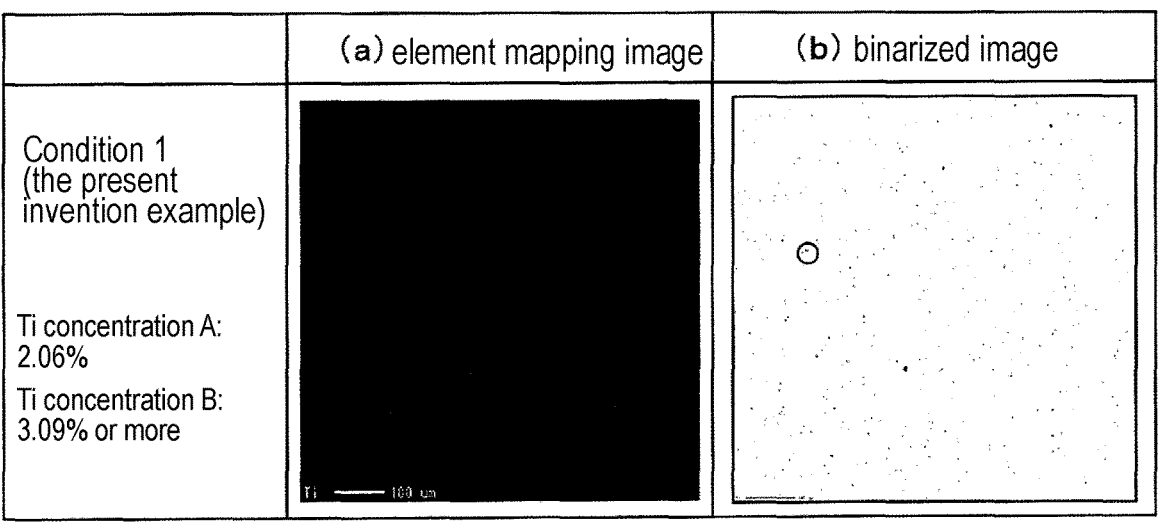
FIG. 3 is a diagram showing an element mapping image (a) of Ti when a cross section parallel to a lamination direction of a laminate shaped article after a heat treatment step of the present invention example is analyzed by an EPMA, and an image (b) obtained by binarizing the image (a).

((a) of FIG. 3) is an element mapping image of Ti in the region which is obtained by the surface analysis using EPMA. Besides, ((b) of FIG. 3) is an image obtained by performing a binarization process in the same manner as in Implementation example 1 on the element mapping image of ((a) of FIG. 3). In ((b) of FIG. 3), in the laminate shaping product under Condition 1, a linear Ti-rich portion having a length of 8 μm is confirmed (circled portion), and a linear Ti-rich portion having a length exceeding 15 μm is not recognized.

Then, a 5 U notch Charpy test in the same manner as in Implementation example 2 is implemented on the laminate shaping product under Condition 1. As a result, an impact value is 39.8 J/cm² and is 30.0 J/cm² or more. The laminate shaping product under Condition 1 has sufficient toughness to be used as various tool products or structural parts.

What is claimed is:

1. A laminate shaped article made of a maraging steel comprising by mass: C: 0.1% or less, Ni: 14-22%, Co: 0-5%, Mo: 0.1-15.0%, Ti: 1.5-5.0%, Al: 3.0% or less, and the balance comprising Fe and impurities, wherein
when surface analysis is performed on concentration distribution of Ti in a cross section parallel to a lamination direction of the laminate shaped article, a linear Ti-rich portion having a Ti concentration B of (1.5×A) or more with respect to an average Ti concentration A in the cross section is confirmed, and a length of the linear Ti-rich portion is 15 μm or less.

2. The laminate shaped article according to claim 1, wherein the hardness of the maraging steel is 40-60 HRC.

3. A method for manufacturing a laminate shaped article, comprising forming an article by a laminate shaping step in which an operation of spreading a metal powder made of a maraging steel on a stage and an operation of scanning and irradiating a heat source on the metal powder spread on the stage are repeatedly performed, wherein the maraging steel comprises by mass: C: 0.1% or less, Ni: 14-22%, Co: 0-20%, Mo: 0.1-15.0%, Ti: 1.5-5.0%, Al: 3.0% or less, and the balance comprising Fe and impurities, wherein
the heat source output is 250-330 W and a scanning speed is 480-3000 mm/sec when the heat source is scanned and irradiated on the metal powder.

4. The method for manufacturing a laminate shaped article according to claim 3 in which a heat treatment step including a solution treatment and an aging treatment is further performed on the article formed in the laminate shaping step.

5. The method for manufacturing a laminate shaped article according to claim 3, wherein the maraging steel has a Co content of 0-5 by mass %.

6. A metal powder for laminate shaping, which is made of a maraging steel and has a median diameter D50 of 200 μm or less, wherein the maraging steel comprises by mass: C: 0.1% or less, Ni: 14-22%, Co: 0-5%, Mo: 0.1-15.0%, Ti: 1.5-5.0%, Al: 3.0% or less, and the balance comprising Fe and impurities.

7. The metal powder for laminate shaping according to claim 6, wherein the maraging steel has a Ti content of 1.5-4.0 by mass %.

8. The metal powder for laminate shaping according to claim 6, wherein the maraging steel has a Mo content of 0.1-10.0 by mass %.

9. The metal powder for laminate shaping according to claim 6, wherein the maraging steel has a Mo content of 0.1-5.0 by mass %.

10. The metal powder for laminate shaping according to claim 6, wherein the maraging steel has an Al content of 1.0 or less by mass %.

11. The metal powder for laminate shaping according to claim 6, wherein the maraging steel has an Al content of 0.5 or less by mass %.

12. The metal powder for laminate shaping according to claim 6, wherein the maraging steel has a Co content of 0.1-5.0 by mass %.

* * * * *